Aug. 14, 1923.
D. FINLEY
BATTERY BOX
Filed May 16, 1921
1,464,868
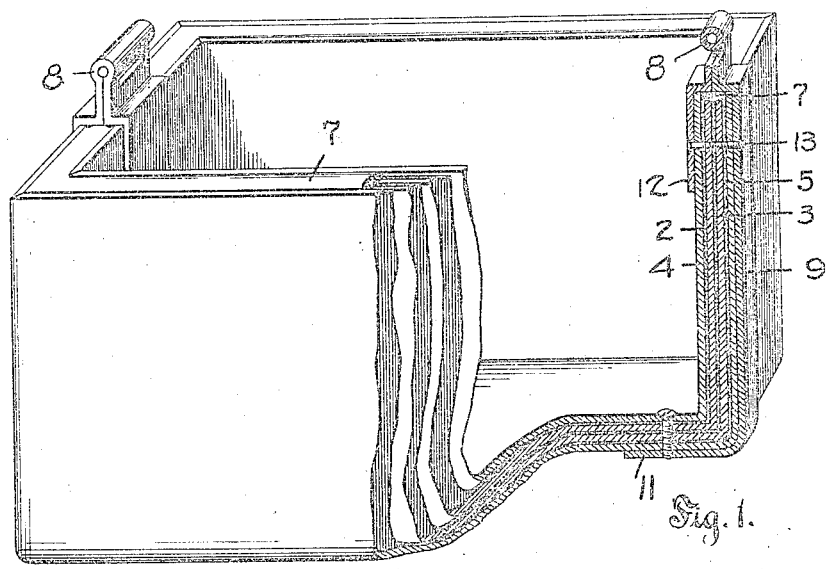
Fig. 1.
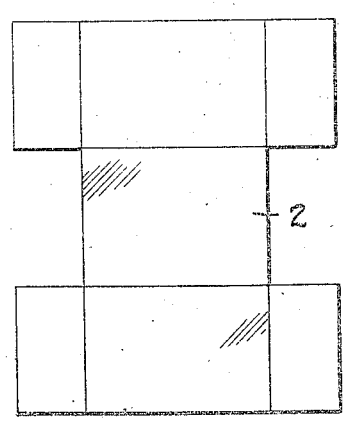
Fig. 2.
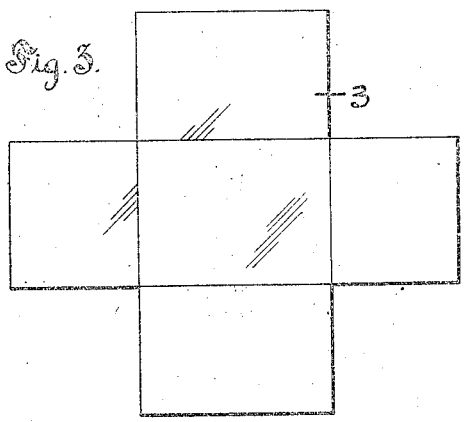
Fig. 3.
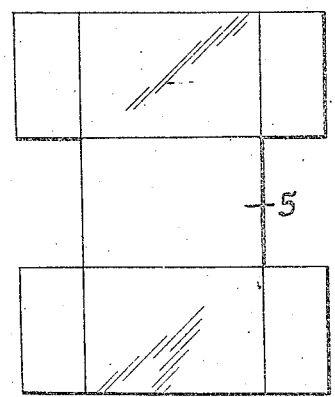
Fig. 5.
Fig. 4.
INVENTOR
DOZIER FINLEY
BY
White Prost Evans
his ATTORNEYS Patented Aug. 14, 1923.

1,464,868

UNITED STATES PATENT OFFICE.

DOZIER FINLEY, OF OAKLAND, CALIFORNIA, ASSIGNOR TO THE PARAFFINE COMPANIES, INC., OF SAN FRANCISCO, CALIFORNIA, A CORPORATION OF DELAWARE.

BATTERY BOX.

Application filed May 16, 1921. Serial No. 470,054.

*To all whom it may concern:*

Be it known that I, DOZIER FINLEY, a citizen of the United States, and a resident of Oakland, county of Alameda, and State of California, have invented a new and useful Battery Box, of which the following is a specification.

My invention relates to box construction and especially to boxes formed of fabricated fibrous sheets.

An object of the invention is to provide a box, particularly suitable for holding storage batteries, at a cost much lower than that of the wooden battery boxes now used. Another object is the provision of a box which will be free from injury by acid from the battery.

The invention possesses other objects and features of advantage, some of which, with the foregoing will be set forth in the following description of the preferred form of my invention which is illustrated in the drawings accompanying and forming part of the specification. It is understood that I do not limit myself to the showing made by the said drawings and description, as I may adopt variations of the preferred form within the scope of my invention as set forth in the claims.

Referring to the drawings: Fig. 1 is a perspective view of my battery box partly in section. Figs. 2, 3, 4 and 5 are plan views respectively of the several sheets, which when folded up and nested together comprise the assembled box.

In terms of broad inclusion my battery box comprises a container formed of a plurality of fabricated fibrous layers, some of which have acid resisting properties, the layers being cemented together and coated with an acid resisting material such as a bituminous or asphaltic compound.

The box illustrated in the drawings is formed of four such layers, the two inner layers 2 and 3 of container board, and the two outer layers 4 and 5 of prepared roofing. Pieces of container board are cut into blanks as shown in Figs. 2 and 3, and the prepared roofing is cut into blanks as shown in Figs. 4 and 5. These blanks are shaped, proportioned and dimensioned so that when folded up in square form, they may be nested together, each layer breaking joints with the contiguous layer, and at any given point the box wall being four layers thick. The inner and outer layers around the edges of the assembled layers extend a short distance beyond the inner layers.

In assembling the layers or blanks, they are cemented together with an acid resisting compound, preferably of bituminous nature. I have used with success asphaltum having a melting point of 200 degrees F. ball and ring method; and a penetration of 18 by Dow penetrometer with a 100 gram weight and standard needle acting for 5 seconds at a temperature of 77 degrees F. I have also successfully used a mixture of equal parts of asphaltum and stearine pitch, the mixture having a melting point and a penetration substantially those stated above.

A mass 7 of the compound is filled in over the edges of the inner layers 2 and 3 between the outer layers 4 and 5 to give extra protection to the edges which of course are subjected to the most wear, and to prevent acid from penetrating between the several layers where they may be, thru imperfections in workmanship, not thoroughly cemented together.

The container board gives the requisite stiffness to the structure and the prepared roofing which is saturated and coated with asphaltic compounds provides a superior wearing surface secure from attack by the battery acid.

After assembling the layers and filling in the edges, the handles 8 are attached. Preferably each handle comprises a plate bent to provide a long member 9 extending across the end of the box and terminating in a laterally bent portion 11 engaging the bottom of the box. The other end 12 of the plate extends a short distance downwardly on the inside of the box and the two members are secured together and to the box by screws or bolts 13 passing thru the outer member and the box end and threaded into the inner member.

As a final step, the box is coated with one or more coats of paint composed of asphaltum dissolved in a suitable solvent, or is dipped in an acid resistant compound such as asphaltum and is ready for use when the final coating is hardened.

A box such as I have described is light in weight, very strong, highly resistant to injury and acid attack, and inexpensive.

I claim:

1. A box comprising outer layers of prepared roofing and inner layers of container board, layers of bituminous compound between said outer and inner layers, and a coating of bituminous compound over said box.

2. A box comprising a plurality of layers of fibrous sheets cemented together, the outer layers of each side wall extending at the edges of the box beyond the enclosed inner layers, a mass of acid resisting material filled in over the edges of the inner layers between the outer layers, and a coating of acid resisting material over said box.

3. A box comprising a plurality of pieces of fibrous material, each piece being folded to provide bottom and side members and the folded pieces being nested together, and a coating of acid resisting material overlying the entire surface of each piece and cementing contiguous surfaces together.

4. A box comprising inner layers of container board and outer layers of prepared roofing, each of said layers being formed of a single piece of material folded to provide bottom and side members, and a coating of acid resisting material overlying the entire surface of each layer and cementing contiguous surfaces together.

5. A box comprising inner layers of container board and outer layers of prepared roofing, each of said layers being formed of a single piece of material folded to provide bottom and side members, and to break joints with the contiguous layer, and a coating of acid resisting material overlying the entire surface of each layer and cementing contiguous surfaces together.

6. A box comprising inner layers of container board and outer layers of prepared roofing, each of said layers being formed of a single piece of material folded to provide bottom and side members, and to break joints with the contiguous layer, the outer layers extending at the edges of the box beyond the inner layers, a mass of bituminous compound filled in over the edges of the inner layers between the outer layers, and a coating of bituminous compound overlying the surface of each layer and cementing contiguous surfaces together.

7. A box comprising a plurality of pieces of fibrous material, each piece being folded to provide bottom and side members and the folded pieces being nested together, a coating of acid resisting material overlying the entire surface of each piece and cementing contiguous surfaces together, and handles for said box comprising plates extending on opposite sides of each end of the box.

8. A box comprising a plurality of layers of fibrous sheets, a coating of acid resisting material overlying the surface of each sheet and cementing contiguous surfaces together, a handle for each end of said box comprising a member extending across the end and terminating in a lateral extension engaging the bottom of said box and a second shorter member on the opposite side of the end, and means piercing the wall of the box and tying said handle members together.

In testimony whereof, I have hereunto set my hand.

DOZIER FINLEY.